United States Patent
Tsuji et al.

(10) Patent No.: US 6,297,291 B2
(45) Date of Patent: Oct. 2, 2001

(54) LIQUID SILICONE RUBBER COMPOSITION OF LOW SPECIFIC GRAVITY

(75) Inventors: Yuichi Tsuji; Yutaka Oka, both of Chiba Prefecture (JP)

(73) Assignee: Dow Corning Toray Silicone Company, Ltd., Tokyo (JP)

( * ) Notice: Subject to any disclaimer, the term of this patent is extended or adjusted under 35 U.S.C. 154(b) by 0 days.

(21) Appl. No.: 09/788,918

(22) Filed: Feb. 20, 2001

(30) Foreign Application Priority Data

Feb. 28, 2000 (JP) .................................. 12-053064

(51) Int. Cl.$^7$ ....................................... C08J 9/32
(52) U.S. Cl. ........................... 521/54; 521/134; 523/218; 523/219
(58) Field of Search ...................... 521/54, 134; 523/218, 523/219

(56) References Cited

U.S. PATENT DOCUMENTS 5,246,973   9/1993   Nakamura et al. .................... 521/54

FOREIGN PATENT DOCUMENTS 05-209080   8/1993   (JP) .................................. C08J/9/14

Primary Examiner—Morton Foelak
(74) Attorney, Agent, or Firm—James L. De Cesare

(57) ABSTRACT

The present invention is a low-specific-gravity liquid silicone rubber composition comprising (A) 100 parts by weight of diorganopolysiloxane which is liquid at room temperature and contains at least two silicon-bonded alkenyl groups in each molecule, (B) an organohydrogenpolysiloxane which has at least two silicon-bonded hydrogen atoms in each molecule at a mole ratio of silicone-bonded hydrogen atoms contained in this component (B) to silicon-bonded alkenyl groups contained in component (A) within a range of 0.3:1 to 5:1, (C) a platinum catalyst providing metallic platinum atoms in an amount of 0.1 to 500 parts by weight per 1,000,000 parts by weight of component (A)

(D) 0.5 to 30 parts by weight of gas-filled hollow particles having shells made of a non-silicone thermoplastic resin, and (E) 0.05 to 10 parts by weight of gas-filled hollow particles having shells made of a thermoplastic silicone resin.

5 Claims, No Drawings

LIQUID SILICONE RUBBER COMPOSITION OF LOW SPECIFIC GRAVITY

FIELD OF THE INVENTION

The present invention relates to a liquid silicone rubber composition of low-specific gravity and in particular to a liquid silicone rubber composition of low specific gravity which produces low-specific-gravity rubber of excellent dimensional stability after heating, during heating, and during cooling.

BACKGROUND OF THE INVENTION

A silicone rubber of low specific gravity is characterized by light weight and excellent heat-resistant and weather-proof properties. Therefore this material finds wide use in the manufacture of items where specific properties of this material can be most efficiently utilized, i.e. various seals, packings, gaskets, 0-rings, or similar automobile parts, as well as coatings for rollers used in copying machines, printers, and facsimile machines. A known low-specific-gravity composition of the aforementioned type comprises an expandable silicone rubber composition produced by incorporating thermoplastic hollow particles into a thermosetting liquid silicone rubber composition under heating (see Japanese Application Hei 5-209,080). A problem associated with this composition, however, is that a foam silicone rubber body obtained after curing the aforementioned composition has a large coefficient of thermal expansion and therefore heating leads to significant changes in its dimensions. For the above reasons, the aforementioned known composition is unacceptable as a material for items, such as coating layers on rollers of copying machines, printers, and facsimile machines, and as automobile gaskets, which require that the composition maintain dimensional accuracy during molding and that articles molded from the silicone rubber maintain dimensional stability during heating or cooling.

The authors have conducted a study aimed at finding a solution to the problems inherent in the prior art and arrived at the present invention. It is an object of the present invention to provide a low-specific-gravity liquid silicone rubber composition, which produces low-specific-gravity rubber that demonstrates excellent dimensional stability after heating, during heating, and during cooling.

SUMMARY OF THE INVENTION

The present invention is a low-specific-gravity liquid silicone rubber composition comprising (A) 100 parts by weight of diorganopolysiloxane which is liquid at room temperature and contains at least two silicon-bonded alkenyl groups in each molecule, (B) an organohydrogenpolysiloxane which has at least two silicon-bonded hydrogen atoms in each molecule at a mole ratio of silicone-bonded hydrogen atoms contained in this component (B) to silicon-bonded alkenyl groups contained in component (A) within a range of 0.3:1 to 5:1, (C) a platinum catalyst providing metallic platinum atoms in an amount of 0.1 to 500 parts by weight per 1,000,000 parts by weight of component (A)

(D) 0.5 to 30 parts by weight of gas-filled hollow particles having shells made of a non-silicone thermoplastic resin, and (E) 0.05 to 10 parts by weight of gas-filled hollow particles having shells made of a thermoplastic silicone resin.

DESCRIPTION OF THE INVENTION

The present invention is a low-specific-gravity liquid silicone rubber composition comprising (A) 100 parts by weight of diorganopolysiloxane which is liquid at room temperature and contains at least two silicon-bonded alkenyl groups in each molecule, (B) an organohydrogenpolysiloxane which has at least two silicon-bonded hydrogen atoms in each molecule at a mole ratio of silicone-bonded hydrogen atoms contained in this component (B) to silicon-bonded alkenyl groups contained in component (A) within a range of 0.3:1 to 5:1, (C) a platinum catalyst providing metallic platinum atoms in an amount of 0.1 to 500 parts by weight per 1,000,000 parts by weight of component (A)

(D) 0.5 to 30 parts by weight of gas-filled hollow particles having shells made of a non-silicone thermoplastic resin, and (E) 0.05 to 10 parts by weight of gas-filled hollow particles having shells made of a thermoplastic silicone resin.

The diorganopolysiloxane comprising component (A) contains in each molecule at least two silicon-bonded alkenyl groups, is liquid at room temperature, is a main component of the present composition, and cross-links to form silicone rubber. The diorganopolysiloxane is described by the following average unit formula $$R_a SiO_{(4-a)/2},$$

where R is a monovalent hydrocarbon group or a halogenated alkyl group. The aforementioned monovalent hydrocarbon group can be represented by methyl, ethyl, propyl, or a similar alkyl group; vinyl, allyl, or a similar alkenyl group; cyclohexyl or a similar cycloalkyl group; β-phenylethyl or a similar aralkyl group; and phenyl or a similar aryl group. The aforementioned halogenated alkyl group can be represented by 3-chloropropyl and 3,3,3-trifluoropropyl. In the above formula "a" is a number with a value between 1.8 and 2.3. Normally, organopolysiloxanes of the above type have a viscosity at 25° C. within a range of 100 to 1,000,000 mPa·s and their molecular structure is mainly linear. However, small molecular chains can be branched from the main chain.

Examples of the diorganopolysiloxane comprising component (A) include dimethylpolysiloxane end-capped with dimethylvinylsiloxy groups, a copolymer of methylvinylsiloxane and dimethylsiloxane end-capped with dimethylvinylsiloxy groups, a copolymer of methylvinylsiloxane and dimethylsiloxane end-capped with silanol groups, a copolymer of methylphenylsiloxane and dimethylsiloxane end-capped with dimethylvinylsiloxy groups, a copolymer of methylphenylsiloxane, methylvinylsiloxane, and dimethylsiloxane end-capped with dimethylvinylsiloxy groups, a copolymer of diphenylsiloxane and dimethylsiloxane end-capped with dimethylvinylsiloxy groups, a copolymer of diphenylsiloxane, methylvinylsiloxane, and dimethylsiloxane end-capped with dimethylvinylsiloxy groups, a copolymer of methyl (3,3,3-trifluoropropyl)siloxane and dimethylsiloxane end-capped with dimethylvinylsiloxy groups, and a copolymer of methyl (3,3,3-trifluoropropyl)siloxane, methylvinylsiloxane, and dimethylsiloxane end-capped with dimethylvinylsiloxy groups.

The organohydrogenpolysiloxane comprising component (B) is a cross-linking agent. In the presence of the platinum catalyst of component (C), silicon-bonded hydrogen atoms of component (B) are added through an addition reaction to silicon-bonded alkenyl groups of the organopolysiloxane of component (A), and the composition is thereby cured. It is required that at least two silicon-bonded hydrogen atoms be present in one molecule of component (B). The following organic groups, other than silicon-bonded hydrogen atoms, can be present in component (B): methyl, ethyl, propyl, and similar alkyl groups; and phenyl, tolyl, and similar aryl groups. Component (B) may have a linear, partially-branched linear, cyclic, or a resin-like structure.

Examples of the aforementioned organohydrogenpolysiloxane include methylhydrogenpolysiloxane having both molecular terminals end-capped with trimethylsiloxy groups, a copolymer of methylhydrogenpolysiloxane and dimethylsiloxane having both molecular terminals end-capped with trimethylsiloxy groups, a copolymer of methylhydrogenpolysiloxane and dimethylsiloxane having both molecular terminals end-capped with dimethylhydrogensiloxy groups. It is recommended that component (B) be used in such an amount that the mole ratio of silicon-bonded hydrogen atoms of this component to silicon-bonded alkenyl groups of component (A) be within a range of 0.3:1 to 5:1. If the above ratio is lower than 0.3:1, the density of cross-linking will be too low. On the other hand, the ratio exceeding 5:1 may cause either a reaction of dehydrogenation with the formation of bubbles or a decrease of heat-resistant properties in the cured silicone rubber.

The platinum catalyst of component (C) is used as a catalyst for curing the present composition. Examples of the aforementioned catalyst include a fine platinum powder, platinum black, chloroplatinic acid, platinum tetrachloride, an alcoholic solution of chloroplatinic acid, an olefin complex of chloroplatinic acid, a complex of chloroplatinic acid and divinyltetramethyldisiloxane, and catalysts comprising finely powdered thermoplastic resins that contain aforementioned platinum catalysts. It is recommended that the platinum catalyst be used in such an amount that the content of metallic platinum atoms constitutes 0.1 to 500 parts by weight, preferably 1 to 50 parts by weight per 1,000,000 parts by weight of component (A).

The gas-filled hollow particles which constitute component (D) make it possible to form a foam and thus to reduce the weight by dispersing air bubbles inside the silicone rubber from which an article is molded from the present composition. The following are examples of thermoplastic resins which are suitable as component (D) and from which the hollow particle shells can be made: polyethylene, polystyrene, polyvinyl acetate, polyvinyl chloride, polyvinylidene chloride, polyacrylonitrile, methyl polymethacrylate, polybutadiene, polychloroprene, or a similar vinyl-type polymer or copolymer thereof; Nylon 6, Nylon 66, or a similar polyamide; poly (ethyleneterephalate), poly (butyleneterephthalate), or a similar polyester; polycarbonate, polyacetal, or mixtures of the above. It is recommended that the softening initiation temperature of the aforementioned hollow particles be within a range of 70° C. to 200° C. Apart from air, nitrogen, or a similar substance which is gaseous at room temperature, the hollow particles can also be filled with butane, isobutene, propane, or a similar hydrocarbon; methanol, ethanol, or a similar alcohol; dichloroethane, trichloroethane, or a similar halogenated hydrocarbon; diethyl ether, isopropyl ether, or a similar volatile substance. It is preferable that at room temperature the hollow particles have a diameter of 5 $\mu$m to 300 $\mu$m. If the diameter of the hollow particles is smaller than 5 $\mu$m, it would be impossible to noticeably reduce the specific gravity of the silicone rubber. If, on the other hand, the diameter of hollow particles exceeds 300 $\mu$m, the hollow particles will loose their strength so that they may break either at the stage of preparation of the present composition or at the stage of formation of articles from the silicone rubber. It is recommended that this component be used in an amount of 0.5 to 30 parts by weight per 100 parts by weight of component (A).

The aforementioned component (E) is a distinguishing feature of the present invention. Component (E) comprises gas-filled hollow particles, the shell of which is made of a thermoplastic silicone resin. After curing of the present composition this component becomes integrally bound to the silicone rubber so that during heating or cooling it improves dimensional stability of silicone-rubber articles formed from the present composition. The following are examples of the aforementioned thermoplastic silicone resins: a silicone resin consisting of methylsiloxane units and methylphenylsiloxane units, a silicone resin consisting of methylsiloxane units, dimethylsiloxane units, and methylphenylsiloxane units. It should be noted that these examples should not be construed as limiting the types of applicable resins. It is recommended that the softening initiation temperature of the aforementioned hollow particles be within the range of 50° C. to 150° C. The following are examples of gases that may fill the hollow particles: air, nitrogen, helium, or a similar inert gas. It is recommended that the hollow particles of this component have dimensions within the range of 0.1 $\mu$m to 100 $\mu$m. If these particles are smaller than 0.1 $\mu$m improvement in dimensional stability will be insignificant. If the particles are larger than 100 $\mu$m, this will reduce the strength of the hollow particles so that they will be prone to breakage during manufacturing of the present composition or at the stage of formation of articles from the silicone rubber. It is recommended that this component be used in an amount of 0.05 to 10 parts by weight per 100 parts by weight of component (A).

The present composition consists of the aforementioned components (A) through (E). If necessary, however, within the limits not detrimental to the objects of the invention, the composition can be combined with various known additives used in conjunction with conventional silicone rubber compositions. Examples of such additives include dry-process silica, wet-process silica, or the aforementioned silicas hydrophobed by surface-treatment with organochlorosilane, organoalkoxysilane, organosiloxane oligomer, or hexaorganodisilazane, colloidal calcium carbonate, or a similar reinforcement filler; diatomaceous earth, quartz powder, mica, aluminum oxide, titanium oxide, and aforementioned compounds surface- treated with an organosiloxane oligomer or hexamethyldisilazane, resin-acid-treated calcium bicarbonate, or a similar non-reinforcement filler; 1-ethynyl-cyclohexanol, 3-methyl-1-penten-3-ol, benzotriazole, or a similar curing inhibitor; oxide of a rare-earth element, hydroxide of a rare-earth element, cerium silanolate,a ceric salt of resin acid, or a similar heat-resistance improver; a flame retardant; an internal mold releasing agent; carbon black, red oxide, titanium oxide, or a similar pigment.

The present composition is prepared by uniformly mixing the aforementioned components (A) through (E) and any other components as described above. Equipment used for the preparation of the present composition may comprise various mixers normally used for the preparation of silicone rubber compositions, such as a kneader mixer, pressure kneader mixer, continuous-flow type kneader extruder, or the like.

When the present composition is heated and cured it turns into a silicone rubber having a low-specific gravity. It is recommended that in this process the heating temperature exceed 80° C. and preferably be within the range of 100 to 180° C. After curing, a silicone rubber of low specific gravity is obtained by integrating cells of the thermoplastic silicone rubber of the aforementioned component (E) into the silicone rubber.

Since the present composition makes it possible to obtained a silicone rubber of low specific gravity, which possesses excellent dimensional stability during forming and is dimensionally stable against thermal expansion after thermal curing and during heating and cooling, it is suitable for use as a material for manufacturing parts that require the aforementioned characteristics, such as coating rollers for copying machines, printers, and facsimile machines, gaskets for vehicles, and gaskets for aircraft applications.

PRACTICAL EXAMPLES

The invention is further described with reference to practical examples. In these examples, all parts are parts by weight and all viscosity values were measured at 25° C. Hardness of cured silicone rubber articles was measured with the use of a type-A hardness measurement apparatus as specified by JIS K 6249 (Japanese Industrial Standard).

Practical Example 1

A liquid silicone-rubber-base compound was prepared by loading into a Ross mixer (Charles Ross & Sons Company of Hauppauge, N.Y.) and then uniformly mixing the following components: 100 parts of dimethylpolysiloxane having both molecular terminals capped with dimethylvinylsiloxy groups (viscosity of 2,000 mPa·s), 10 parts of fumed silica surface-treated with hexamethyldisilazane and having a BET-method specific surface area of 130 m$^2$/g, 12 parts of thermoplastic resin hollow particles (with softening initiation temperature of 140° C. and an average particle diameter of 100 µm; product of Matsumoto Yushi-Seiyaku Co., Ltd, trademark MFL-100CA), and 2 parts of silicone thermoplastic resin hollow particles with softening initiation temperature of 80° C. and with an average particle diameter of 40 µm, the aforementioned thermoplastic resin consisting of methylsiloxane units and methylphenylsiloxane units in a 22:78 mole ratio. A liquid silicone rubber composition was prepared by combining and uniformly mixing the obtained liquid silicone-rubber-base compound with 2 parts of a copolymer of dimethylsiloxane and methylhydrogensiloxane having both molecular terminals capped with trimethylsiloxy groups and composed of 40 mole % of dimethylsiloxane units and 60 mole % of dimethylhydrogensiloxane units, 0.15 parts (0.4 wt % metallic platinum) of a complex of chloroplatinic acid and divinyltetramethyldisiloxane, and 0.05 parts of a curing inhibitor in the form of 3,5-dimethyl-1-hexyn-3-ol. The obtained composition had a viscosity of 400 Pa·s. After curing the obtained composition for 10 Min. under pressure at 120° C., it was heat treated in an oven for 4 hours at 200° C., then left intact at room temperature for 3 days, whereby a 6 mm-thick silicone rubber sheet was produced. After cooling, the aforementioned silicone rubber sheet had a specific gravity of 0.55 and hardness of 31. For testing dimensional stability of the obtained silicone rubber sheet against heating, the dimensions of the sheet were stabilized by retaining it intact for 3 days at room temperature, and marks were made on the sheet at a distance of 100 mm from one another. The sheet was then heated for 4 hours in an oven at 200° C., and after 30 Min. cooling the distance between the marks was measured. The measured length of 99.5 mm confirmed that the dimensions remain almost the same as prior to heating.

Comparative Example 1

A liquid silicone rubber composition was prepared in a similar manner as in Practical Example 1, except that silicone rubber hollow particles were not added. The composition had a viscosity of 410 Pa·s. After curing the composition under pressure for 10 Min. at 120° C., the composition was heat treated in an oven for 4 hours at 200° C., retained for 3 days intact at room temperature, and formed into a 6 mm-thick silicone rubber sheet. After cooling, the aforementioned silicone rubber sheet had a specific gravity of 0.52 and hardness of 30. For testing dimensional stability of the obtained silicone rubber sheet against heating, the dimensions of the sheet were stabilized by retaining it intact for 3 days at room temperature, and marks were made on the sheet at a distance of 100 mm from one another. The sheet was then heated again for 4 hours in an oven at 200° C., and after 30 Min. cooling the distance between the marks was measured. The measured length of 98.5 mm showed that the sheet shrunk by 1.5% from the condition prior to heating.

Practical Example 2

A liquid silicone-rubber-base compound was prepared by loading into a Ross mixer and then uniformly mixing the following components: 100 parts of dimethylpolysiloxane having both molecular terminals capped with dimethylvinylsiloxy groups (viscosity of 2,000 mPa·s), 10 parts of fumed silica surface-treated with hexamethyldisilazane and having a BET-method specific surface area of 130 m$^2$/g, 1.5 parts of thermoplastic resin hollow particles (with softening initiation temperature of 120° C. and an average particle diameter of 50 to 80 µm; product of Expancel Co., Ltd, trademark 091DE-80), and 2 parts of silicone thermoplastic resin hollow particles with softening initiation temperature of 80° C. and with an average particle diameter of 40 µm, the aforementioned thermoplastic resin consisting of methylsiloxane units and methylphenylsiloxane units in a 22:78 mole ratio. A liquid silicone rubber composition was prepared by combining and uniformly mixing the obtained liquid silicone-rubber-base compound with 2 parts of a copolymer of dimethylsiloxane and methylhydrogensiloxane having both molecular terminals capped with trimethylsiloxy groups and composed of dimethylhydrogensiloxane units (6 moles) and dimethylsiloxane units (4 moles), 0.15 parts (0.4 wt % metallic platinum) of a complex of chloroplatinic acid and divinyltetramethyldisiloxane, and 0.05 parts of a curing inhibitor in the form of 3,5-dimethyl-1-hexyn-3-ol. The obtained composition had a viscosity of 350 Pa·s. After curing the obtained composition for 10 Min. under pressure at 120° C., it was heat treated in an oven for 4 hours at 200° C., then left intact at room temperature for 3 days, whereby a 6 mm-thick silicone rubber sheet was produced. After cooling, the aforementioned silicone rubber sheet had a specific gravity of 0.53 and hardness of 28. For testing dimensional stability of the obtained silicone rubber sheet against heating, the dimensions of the sheet were stabilized by retaining it intact for 3 days at room temperature, and marks were made on the sheet at a distance of 100 mm from one another. The sheet was then heated for 4 hours in an oven at 200° C., and after 30 Min. cooling the distance between the marks was measured. The measured length of 99.7 mm confirmed that the dimensions remain almost the same as prior to heating.

Comparative Example 2

A liquid silicone rubber composition was prepared similar to the manner as in Practical Example 2, except that silicone thermoplastic rubber hollow particles were not added. The composition had a viscosity of 330 Pa·s. After curing the composition under pressure for 10 min at 120° C., the composition was heat treated in an oven for 4 hours at 200° C., retained for 3 days intact at room temperature, and formed into a 6 mm-thick silicone rubber sheet. After cooling, the aforementioned silicone rubber sheet had a specific gravity of 0.52 and hardness of 28. For testing dimensional stability of the obtained silicone rubber sheet against heating, the dimensions of the sheet were stabilized by retaining it intact for 3 days at room temperature, and marks were made on the sheet at a distance of 100 mm from one another. The sheet was then heated again for 4 hours in an oven at 200° C., and after 30 Min. cooling the distance between the marks was measured. The measured length of 98.7 mm showed that the sheet shrunk by 1.3% from the condition prior to heating.

We claim:

1. A low-specific-gravity liquid silicone rubber composition comprising
   (A) 100 parts by weight of diorganopolysiloxane which is liquid at room temperature and contains at least two silicon-bonded alkenyl groups in each molecule,
   (B) an organohydrogenpolysiloxane which has at least two silicon-bonded hydrogen atoms in each molecule at a mole ratio of silicone-bonded hydrogen atoms contained in this component (B) to silicon-bonded alkenyl groups contained in component (A) within a range of 0.3:1 to 5:1,
   (C) a platinum catalyst providing metallic platinum atoms in an amount of 0.1 to 500 parts by weight per 1,000,000 parts by weight of component (A)
   (D) 0.5 to 30 parts by weight of gas-filled hollow particles having shells made of a non-silicone thermoplastic resin, and
   (E) 0.05 to 10 parts by weight of gas-filled hollow particles having shells made of a thermoplastic silicone resin.

2. A low-specific-gravity liquid silicone rubber composition according to claim 1, where component (A) is a diorganopolysiloxane having a viscosity at 25° C. within a range of 100 to 1,000,000 mPa·s.

3. A low-specific-gravity liquid silicone rubber composition according to claim 1, where the hollow particles of component (D) have a diameter of 5 $\mu$m to 300 $\mu$m.

4. A low-specific-gravity liquid silicone rubber composition according to claim 1, where the hollow particles of component (E) have a diameter of 0.1 $\mu$m to 100 $\mu$m.

5. A low-specific-gravity liquid silicone rubber composition according to claim 1, where component (E) is a thermoplastic silicone resin consisting of methylsiloxane units and methylphenylsiloxane units or a thermoplastic silicone resin consisting of methylsiloxane units, dimethylsiloxane units, and methylphenylsiloxane units.

* * * * *